(12) United States Patent
Miyamoto

(10) Patent No.: US 11,361,466 B2
(45) Date of Patent: Jun. 14, 2022

(54) POSITION INFORMATION ACQUISITION DEVICE, POSITION INFORMATION ACQUISITION METHOD, RECORDING MEDIUM, AND POSITION INFORMATION ACQUISITION SYSTEM

(71) Applicant: CASIO COMPUTER CO., LTD., Tokyo (JP)

(72) Inventor: Naotomo Miyamoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/683,992

(22) Filed: Nov. 14, 2019

(65) Prior Publication Data
US 2020/0175716 A1    Jun. 4, 2020

(30) Foreign Application Priority Data

Nov. 30, 2018  (JP) .............................. JP2018-224457
Jun. 5, 2019   (JP) .............................. JP2019-105599

(51) Int. Cl.
*G06T 7/73* (2017.01)

(52) U.S. Cl.
CPC ...... *G06T 7/73* (2017.01); *G06T 2207/10016* (2013.01); *G06T 2207/30244* (2013.01)

(58) Field of Classification Search
CPC .......... G06T 7/55; G06T 7/593; G06T 7/596; G06T 7/70; G06T 7/73; G06T 7/74;

(Continued)

(56) References Cited

U.S. PATENT DOCUMENTS

2013/0342641 A1*  12/2013  Morioka et al. ....... G03B 35/08
                                                        348/36
2016/0292533 A1*  10/2016  Uchiyama et al. .. H04N 13/366
(Continued)

FOREIGN PATENT DOCUMENTS

CN      103217147 A      7/2013
JP      H08261719 A     10/1996
(Continued)

OTHER PUBLICATIONS

Machine translation of JP 2016-136112 A, Jul. 2016.*
(Continued)

*Primary Examiner* — Andrew W Johns
(74) *Attorney, Agent, or Firm* — Fitch, Even, Tabin & Flannery LLP

(57) ABSTRACT

A position information acquisition device for acquiring position information of a position acquisition target arranged in a space includes a processor configured to detect light that is based on identification information included in-common in captured images that are images of the space captured from a plurality of shooting directions that are different from each other, acquire a three-dimensional position in the space of the position information acquisition target identified by the identification information, based on detection positions of the detected light in the captured images, and position information of image capturing devices during capturing performed by the image capturing devices, acquire reliability degree information of the acquired three-dimensional position of the position information acquisition target, based on information relating to an imaging state of each image capturing device during capturing of the captured images, and store the acquired the reliability degree information in a storage.

7 Claims, 13 Drawing Sheets

(58) Field of Classification Search
CPC ............ G06T 7/97; G06T 2207/30244; G06K 9/6201; G06K 9/6202; G01C 11/06; G01C 11/08; G01C 11/30; G06V 10/75; G06V 10/751; G06V 30/19007; G06V 30/19013
See application file for complete search history.

(56) References Cited

U.S. PATENT DOCUMENTS

| | | | | |
|---|---|---|---|---|
| 2020/0012877 | A1* | 1/2020 | Kotake et al. | G06K 9/3208 |
| 2020/0250849 | A1* | 8/2020 | Asai et al. | B60W 40/114 |

FOREIGN PATENT DOCUMENTS

| | | |
|---|---|---|
| JP | 2003-150940 A | 5/2003 |
| JP | WO2003036829 A1 | 5/2003 |
| JP | WO2005124687 A1 | 12/2005 |
| JP | 2009-143722 A | 7/2009 |
| JP | 2013-83505 A | 5/2013 |
| JP | 2016-136112 A | 7/2016 |
| JP | 2017-101960 A | 6/2017 |
| JP | 2018-5543 A | 1/2018 |

OTHER PUBLICATIONS

JPO; Application No. 2019-105599; Notice of Reasons for Refusal dated Jul. 6, 2021.
CNIPA; Application No. 201911151905.8; Office Action dated Aug. 2, 2021.
JPO; Application No. 2019-105599; Notice of Reasons for Refusal dated Feb. 1, 2022.

* cited by examiner

*FIG. 10*

| MARKER | ID | ARRANGEMENT POSITION | CAMERA PAIR | RELIABILITY DEGREE | UPDATE TIME AND DATE | ERROR |
|---|---|---|---|---|---|---|
| 300a | P300A | (Xd, Yd, Zd) | 201a, 201d | A | 2019.4.20,10:00 | R2 |
| | | (Xd´, Yd´, Zd´) | 201b, 201d | C | 2019.4.20,09:00 | R3 |
| | | (Xd´´, Yd´´, Zd´´) | 201a, 201b | B | 2019.4.20,11:00 | R1 |
| 300b | P300B | (Xe, Ye, Ze) | 201b, 201c | C | 2019.4.20,09:00 | R3 |
| | | (Xe´, Ye´, Ze´) | 201a, 201b | B | 2019.4.20,10:00 | R2 |
| | | (Xe´´, Ye´´, Ze´´) | 201c, 201d | A | 2019.4.20,11:00 | R1 |
| ⋮ | ⋮ | ⋮ | ⋮ | ⋮ | ⋮ | ⋮ |

| MARKER | ID | ARRANGEMENT POSITION | CAMERA PAIR | RELIABILITY DEGREE | UPDATE TIME AND DATE | ERROR |
|---|---|---|---|---|---|---|
| 102a | P102A | (Xa, Ya, Za) | 201a, 201d | A | 2019.4.20,09:00 | R1 |
| | | (Xa´, Ya´, Za´) | 201b, 201d | B | 2019.4.20,10:00 | R2 |
| | | (Xa´´, Ya´´, Za´´) | 201a, 201b | C | 2019.4.20,09:00 | R3 |
| 102b | P102B | (Xb, Yb, Zb) | 201a, 201d | A | 2019.4.20,10:00 | R2 |
| | | (Xb´, Yb´, Zb´) | 201b, 201c | C | 2019.4.20,09:00 | R3 |
| | | (Xb´´, Yb´´, Zb´´) | 201a, 201b | B | 2019.4.20,11:00 | R1 |
| 102c | P102C | (Xc, Yc, Zc) | 201b, 201c | A | 2019.4.20,09:00 | R3 |
| | | (Xc´, Yc´, Zc´) | 201a, 201b | B | 2019.4.20,10:00 | R2 |
| | | (Xc´´, Yc´´, Zc´´) | 201c, 201d | C | 2019.4.20,11:00 | R1 |
| ⋮ | ⋮ | ⋮ | ⋮ | ⋮ | ⋮ | ⋮ |
| 300a | P300A | (Xd, Yd, Zd) | 201a, 201d | A | 2019.4.20,10:00 | R2 |
| | | (Xd´, Yd´, Zd´) | 201b, 201d | C | 2019.4.20,09:00 | R3 |
| | | (Xd´´, Yd´´, Zd´´) | 201a, 201b | B | 2019.4.20,11:00 | R1 |
| 300b | P300B | (Xe, Ye, Ze) | 201b, 201c | C | 2019.4.20,09:00 | R3 |
| | | (Xe´, Ye´, Ze´) | 201a, 201b | B | 2019.4.20,10:00 | R2 |
| | | (Xe´´, Ye´´, Ze´´) | 201c, 201d | A | 2019.4.20,11:00 | R1 |
| ⋮ | ⋮ | ⋮ | ⋮ | ⋮ | ⋮ | ⋮ |

2052

POSITION INFORMATION ACQUISITION DEVICE, POSITION INFORMATION ACQUISITION METHOD, RECORDING MEDIUM, AND POSITION INFORMATION ACQUISITION SYSTEM

CROSS-REFERENCE TO RELATED APPLICATION

This application claims the benefit of Japanese Patent Application No. 2018-224457, filed on Nov. 30, 2018, and Japanese Patent Application No. 2019-105599, filed on Jun. 5, 2019, of which the entirety of the disclosures is incorporated by reference herein.

FIELD

The present disclosure relates to a position information acquisition device, a position information acquisition method, a recording medium, and a position information acquisition system.

BACKGROUND

As described in International Publication No. WO2005/124687, technology is known heretofore that identifies three-dimensional positions of multiple markers by using multiple cameras to image markers.

SUMMARY

According to the present disclosure, a position information acquisition device for acquiring position information of a position acquisition target arranged in a space includes a processor configured to detect light that is based on identification information included in-common in captured images that are images of the space captured from a plurality of shooting directions that are different from each other, acquire a three-dimensional position in the space of the position information acquisition target identified by the identification information, based on detection positions of the detected light in the captured images, and position information of image capturing devices during capturing performed by the image capturing devices by which the images are captured, acquire reliability degree information of the acquired three-dimensional position of the position information acquisition target, based on information relating to an imaging state of each image capturing device of the image capturing devices during capturing of the captured images, and store the acquired the reliability degree information in a storage.

In the present disclosure, a position information acquisition method for acquiring position information of a position acquisition target arranged in a space includes:

detecting light that is based on identification information included in-common in captured images that are images of the space captured from a plurality of shooting directions that are different from each other;

acquiring a three-dimensional position in the space of the position information acquisition target identified by the identification information, based on detection positions of the detected light in the captured images, and position information of image capturing devices during capturing performed by the image capturing devices by which the images are captured;

acquiring reliability degree information of the acquired three-dimensional position of the position information acquisition target, based on information relating to an imaging state of each image capturing device of the image capturing devices during capturing of the captured images; and storing the acquired the reliability degree information in a storage.

In the present disclosure, a non-transitory computer-readable recording medium records a program that causes a computer included in a position information acquisition device for acquiring position information of a position acquisition target arranged in a space to function as:

detection means for detecting light that is based on identification information included in-common in captured images that are images of the space captured from a plurality of shooting directions that are different from each other;

means for acquiring a three-dimensional position in the space of the position information acquisition target identified by the identification information, based on detection positions of the detected light in the captured images, and position information of image capturing devices during capturing performed by the image capturing devices by which the images are captured, means for acquiring reliability degree information of the acquired three-dimensional position of the position information acquisition target, based on information relating to an imaging state of each image capturing device of the image capturing devices during capturing of the captured images, and means for storing the acquired the reliability degree information in a storage.

In the present disclosure, a position information acquisition system includes:

image capturing devices configured to capture images of a space from a plurality of shooting directions that are different from each other; and a position information acquisition device configured to acquire position information of a position acquisition target arranged in the space.

The position information acquisition device includes a processor configured to detect light that is based on identification information included in-common in captured images that are images captured by the image capturing devices, acquire a three-dimensional position in the space of the position information acquisition target identified by the identification information, based on detection positions of the detected light in the captured images, and position information of the image capturing devices during capturing performed by image capturing devices by which the images are captured, acquire reliability degree information of the acquired three-dimensional position of the position information acquisition target, based on information relating to an imaging state of each image capturing device of the image capturing devices during capturing of the captured images, and store the acquired the reliability degree information in a storage.

BRIEF DESCRIPTION OF THE DRAWINGS

A more complete understanding of this application can be obtained when the following detailed description is considered in conjunction with the following drawings, in which:

FIG. 10 illustrates an example of the position-reliability degree information table according to the other embodiment;

FIG. 12 illustrates an example of the position-reliability degree information table according to the other embodiment.

DETAILED DESCRIPTION

A visible light communication system is described below as a position information acquisition system according to an embodiment of the present disclosure with reference to drawings.

Figure 1:
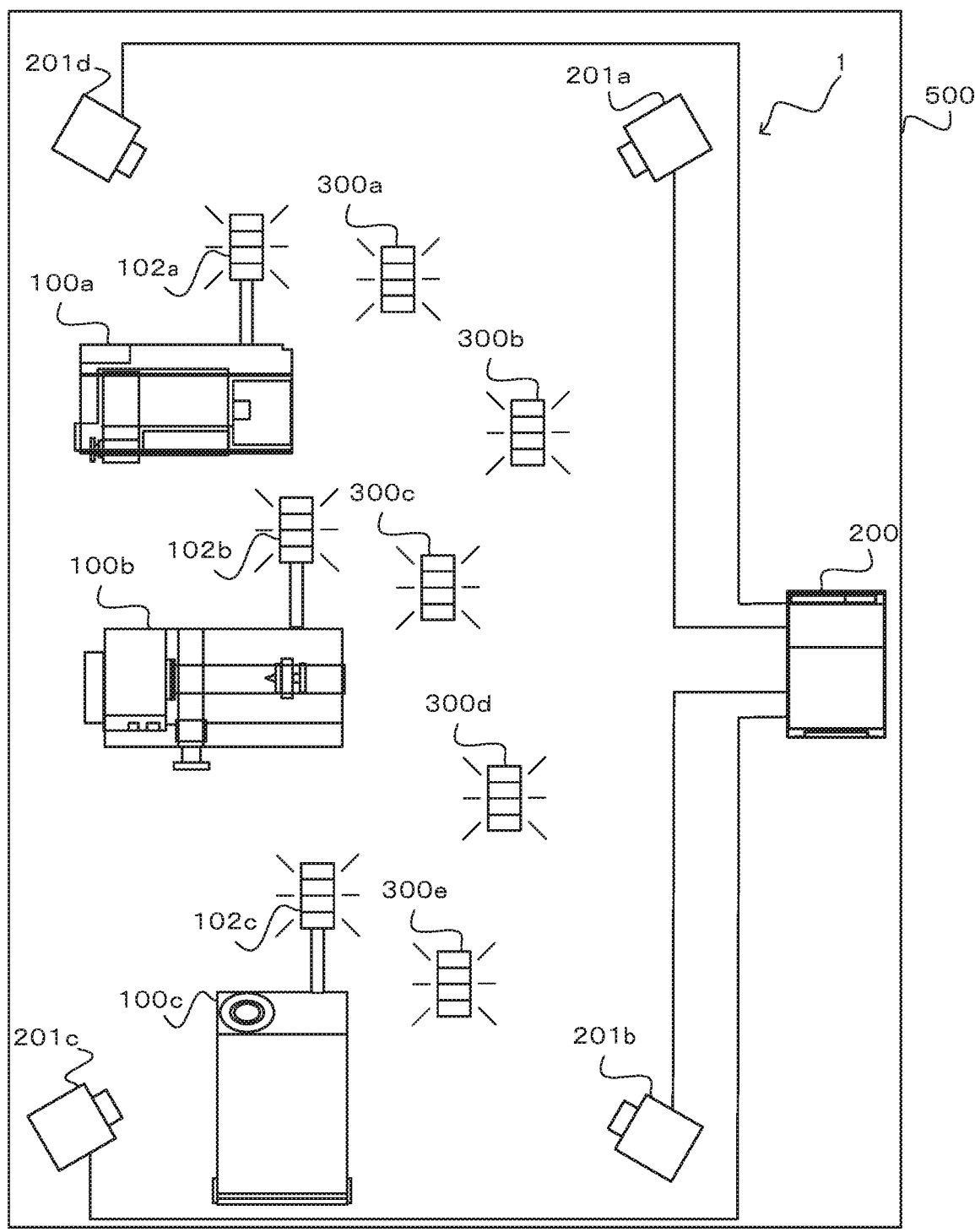
FIG. 1 illustrates an example of a visible light communication system according to an embodiment of the present disclosure.

FIG. 1 illustrates configuration of the visible light communication system. As illustrated in FIG. 1, the visible light communication system 1 is configured to include: apparatuses 100a, 100b, and 100c abbreviated below appropriately as the "apparatus 100" when not limited to a given apparatus 100a, 100b, or 100c) arranged within a space 500; and a server 200 corresponding to a position information acquisition device.

A second marker 102a is attached to the apparatus 100a; a second marker 102b is attached to the apparatus 100b; a second marker 102c is attached to the apparatus 100c; and these markers are abbreviated below appropriately as the "second marker 102" when not limited to a given second marker 102a, 102b, or 102c. Cameras 201a, 201b, 201c, and 201d corresponding to image capturing devices are attached to the server 200; and are abbreviated below appropriately as the "camera 201" when not limited to a given camera 201a, 201b, 201c, or 201d. Moreover, first markers 300a, 300b, 300c, 300d, and 300e are arranged within the space 500; and are abbreviated below appropriately as the "first marker 300" when not limited to a given first marker 300a, 300b, 300c, 300d, or 300e. The first marker 300 and the second marker 102 each include a non-illustrated light emitting diode (LED). The second marker 102 corresponds to a position information acquisition target.

In the present embodiment, the second marker 102 attached to the apparatus 100 transmits information by emitting light corresponding to information of various types of transmission targets such as a state of the apparatus 100. The server 200 demodulates changes in emitted-light color in images of light obtained by time-series type capturing by the cameras 201, and acquires information emitted by the second marker 102.

In the present embodiment, positions and imaging directions of the cameras 201a to 201d are initially unknown. Thus prior to the acquiring by the server 200 of information such as the state of the apparatus 100, firstly the positions (arrangement positions) and the imaging directions of the cameras 201a to 201d in the space 500 that is a three-dimensional space are calculated by the server 200 on the basis of the positions, as two-dimensional coordinate information, of each representation of the first markers 300a, 300b, 300c, 300d, and 300e in the images captured by the cameras 201a to 201d. The server 200 generates a conversion matrix for converting positions (two-dimensional coordinate information) of the images of the first markers 300 in the images obtained by capturing into positions (arrangement positions) within the space 500.

Figure 2:
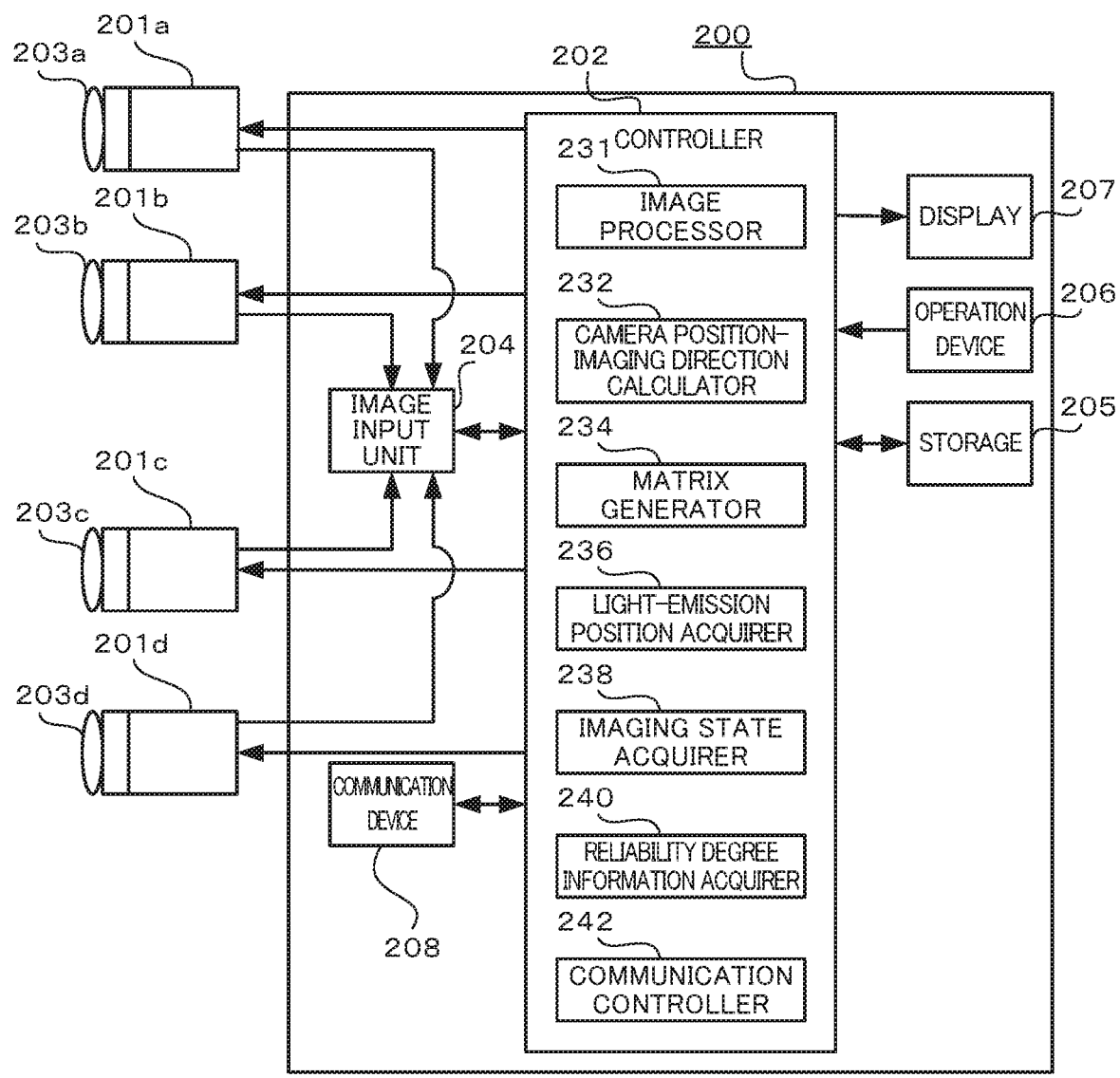
FIG. 2 illustrates an example of configuration of a server according to the same embodiment.

FIG. 2 illustrates an example of configuration of the server 200. As illustrated in FIG. 2, the server 200 includes a controller 202, an image input unit 204, a storage 205, an operation device 206, a display 207, and a communication device 208. The server 200 is attached through lines to the cameras 201a to 201d.

The camera 201a includes a lens 203a; the camera 201b includes a lens 203b; the camera 201c includes a lens 203c; the camera 201d includes a lens 203d; and the lenses are abbreviated below appropriately as the "lens 203" when not limited to a given lens 203a, 203b, 203c, or 203d. The lens 203 includes components such as a zoom lens. The lens 203 moves due to a zoom control operation from the operation device 206 and focal control by the controller 202. The view angle and/or optical image captured by the camera 201 is controlled by movement of the lens 203.

The cameras 201a to 201d each include multiple light-receiving elements orderly disposed in a two-dimensional array on a light-receiving surface. The light-receiving element is an image capturing device such as a charge coupled device (CCD), a complementary metal oxide semiconductor (CMOS), or the like. Each of the cameras 201a to 201d captures an optical image from light entering through the lens 203 (receives light) in the view angle of a prescribed range on the basis of a control signal from the controller 202, and generates a frame by converting the image signal within the imaged view angle to digital data. Further, each of the cameras 201a to 201d continues over time with the imaging and the frame generation, and outputs the continuing frame to the image input unit 204 within the server 200.

On the basis of the control signal from the controller 202, the frame (digital data) output from the camera 201 is input to the image input unit 204.

The controller 202 is a processor that includes components such as a central processing unit (CPU). The controller 202 controls various types of functions with which the server 200 is equipped by executing software processing in accordance with programs, that is, programs for achieving operations of the server 200 illustrated in a below-described FIG. 3, stored in the storage 205.

The storage 205 is random access memory (RAM) and/or read only memory (ROM), for example. The storage 205 stores various types of information, such as programs, used in operations such as control by the server 200.

The operation device 206 includes components such as a numeric keypad and/or function keys, and is an interface that is used for input of operational content of a user. The display 207 includes a display such as a liquid crystal display (LCD), a plasma display panel (PDP), an electro-luminescence (EL) display, or the like. The display 207 displays an image in accordance with an image signal output from the controller 202. The communication device 208 is a device such as a local area network (LAN) card. Under control by a communication controller 242, the communication device 208 performs communication with an external communication device.

The controller 202 includes an image processor 231, a camera position-imaging direction calculator 232, a matrix generator 234, a light-emission position acquirer 236 corresponding to calculation means, an imaging state acquirer 238 corresponding to information acquisition means, a reliability degree information acquirer 240 corresponding to reliability degree information acquisition means, and the communication controller 242.

The image processor 231 adjusts image quality and/or image size by performing peripheral darkening correction and/or distortion correction to allow display of, as a through image on the display 207, a frame, that is, digital data, output from each of the cameras 201 and input to the image input unit 204. The image processor 231 has functions for, upon input of a control signal based on the command operation from the operation device 206, encoding and file generation from the optical image within the view angle of the camera 201 or the optical image in the display range displayed on the display 207 at the time of the command, the encoding and file generation using a compression-encoding format such as the joint photographic experts group (JPEG) format. The camera position-imaging direction calculator 232 calculates the position (two-dimensional coordinate information) of representations of the first marker 300 in each of the images captured by the cameras 201a to 201d. Here, the arrangement positions (three-dimensional coordinate information) of the first markers 300a, 300b, 300c, 300d, and 300e within the space 500 are assumed to be previously known. Each of the first markers 300a, 300b, 300c, 300d, and 300e emits light that changes cyclically in a pattern of three colors red (R), green (G), and blue (B) modulated with an identification (ID) that enables unique identification of the marker.

The camera position-imaging direction calculator 232, from among the cameras 201a to 201d, sets combinations of cameras as pairs of cameras 201, that is, camera pairs. Six patterns (six sets) result from making combinations of pairs of the cameras 201 freely from among 4 cameras 201.

The camera position-imaging direction calculator 232 detects light of the cyclical three-colored patterns included in various images captured by the cameras 201a to 201d. Further, the camera position-imaging direction calculator 232 attempts detecting the ID corresponding to the pattern of light emitted in these three colors, and attempts demodulating into the ID. The storage 205 stores the arrangement position in association with the ID for each of the first marker 300a, 300b, 300c, 300d, and 300e.

Further, the camera position-imaging direction calculator 232, for each camera pair, attempts detection of modulation light regions (pixel regions formed from an identified size and shape and having a luminosity value of at least a predetermined value) in which light is modulated with the same ID, from among both images captured by the pair of cameras 201 included in the camera pair. Thereafter, if the detection succeeds, the first marker 300 corresponding to the ID thereof is regarded to be detectable. For each camera pair, the camera position-imaging direction calculator 232 further recognizes a detection count of the first markers 300.

Thereafter, for each of the camera pairs, the camera position-imaging direction calculator 232 sets an algorithm for calculation of the position (arrangement position) and imaging direction in the space 500 of the two cameras 201 included in the camera pair, in accordance with the count of the first markers 300 included in both of the images captured by the pair of cameras 201 included in the camera pair. The count of prepared algorithms depends on the count of first markers 300 included in the images, such as, for example, preparation of 5 algorithms in the case in which the count of the first markers 300 included in the images captured by the camera pair is 5, and preparation of 8 algorithms in the case in which the count is 8, and the prepared algorithms are stored in the storage 205.

Thereafter, for each of the camera pairs, the camera position-imaging direction calculator 232 uses the set algorithm to calculate the arrangement positions and the imaging directions of the two cameras 201 included in the camera pair.

Figure 3:
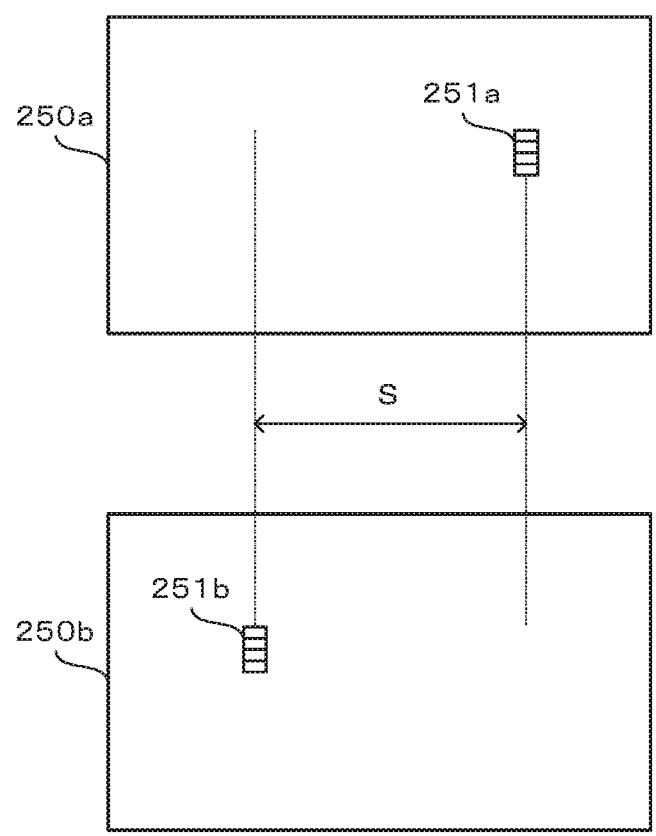
FIG. 3 illustrates an example of parallax obtained from images captured by two cameras according to the same embodiment.

The algorithm is described below. FIG. 3 illustrates an example of parallax obtained from images captured by the cameras 201. Moreover, FIG. 4 illustrates an example of calculation of the arrangement positions and the imaging directions of the camera 201.

As illustrated in FIG. 3, in the case of capture of the same first marker 300c by two cameras 201 (in this case, cameras 201a and 201b) included in the camera pair, the arrangement positions of the camera 201a and the camera 201b are different from each other, and thus parallax S occurs between a position (two-dimensional coordinate information) of a representation 251a of the first marker 300c in the image of an imaging plane 250a captured by the camera 201a and a position (two-dimensional coordinate information) of a representation 251b of the first marker 300c in the image of an imaging plane 250b captured by the camera 201b.

Figure 4:
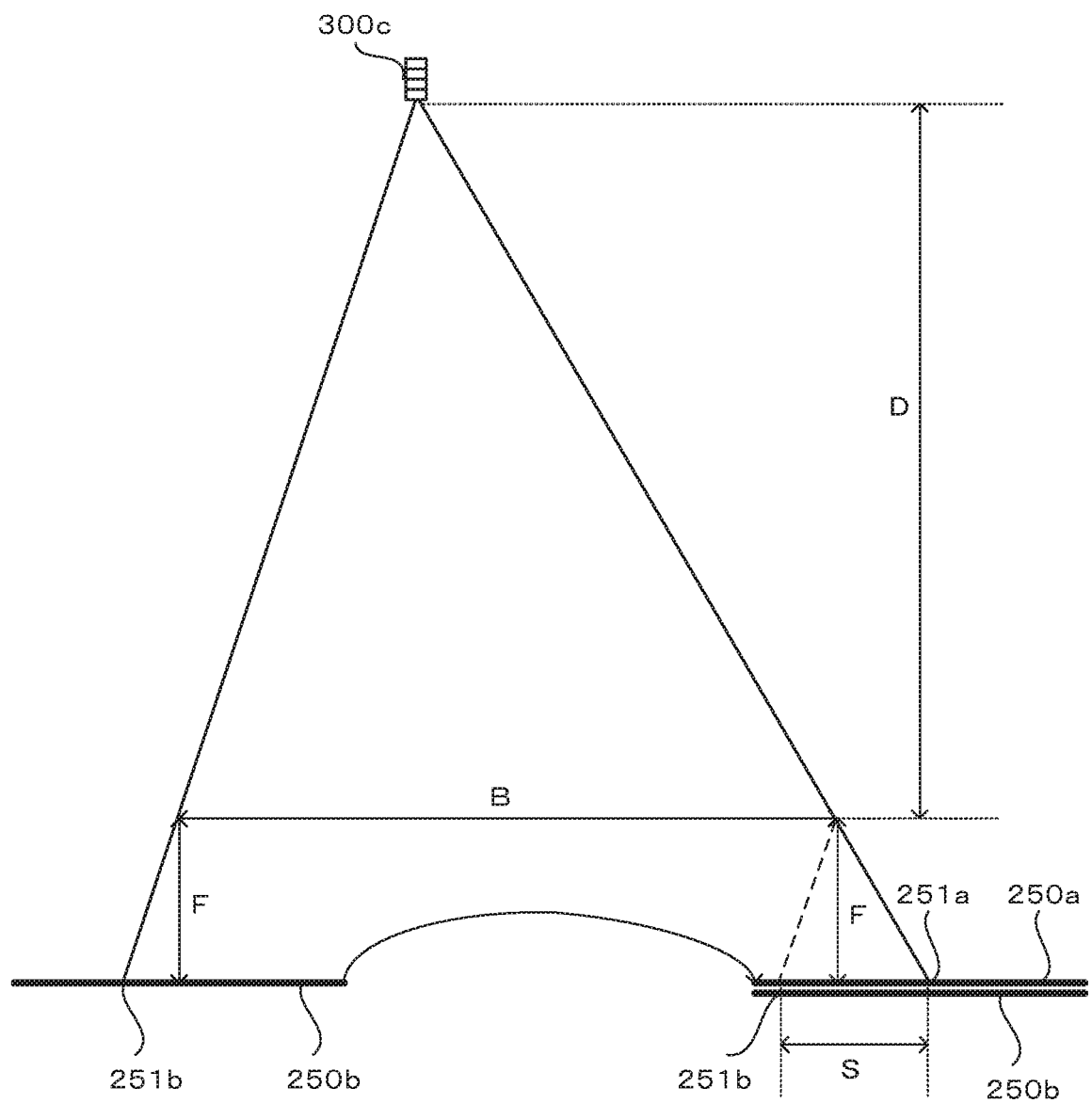
FIG. 4 illustrates an example of calculation of arrangement positions and imaging directions of two cameras according to the same embodiment.

Moreover, a distance calculation formula $D = B \times F / S$ is established in which, as illustrated in FIG. 4, F (same value) is taken to be a distance to the focal position from the imaging plane 250a of one of the cameras 201 (camera 201a in this case) among the two cameras 201 (cameras 201a and 201b in this case) included in the camera pair, F (same value) is taken to be a distance to the focal position from the imaging plane 250b of the other camera 201 (camera 201b in this case), B is taken to be a distance between the arrangement positions of the camera 201a and the camera 201b, D is taken to be a shortest distance between the first marker 300c and a straight line interconnecting the focal position of the camera 201a and the focal position of the camera 201b, and S is taken to be the parallax between the position of the representation 251a and the position of the representation 251b of the first marker 300c obtained by virtual overlapping of the imaging plane 250a and the imaging plane 250b. In this formula, F and S are taken to be previously known constants.

In the present embodiment, the camera position-imaging direction calculator 232 sets up the respective distance calculation formula for each of the detected first markers 300, rather than just setting up the distance calculation formula for the first marker 300c. Further, the camera position-imaging direction calculator 232 calculates the arrangement positions and the captures directions of the two cameras 201 included in the camera pair, on the basis of the set distance calculation formula and the arrangement positions of the first markers 300 measured beforehand.

Specifically, the camera position-imaging direction calculator 232 determines the relative arrangement positions and the imaging directions of the two cameras 201 from a combination of positions (Xga1, Yga1) of the representation 251a of the first marker 300 included in the image captured by one of the cameras 201 of the two cameras 201 included in the camera pair and positions (Xgb1, Ygb1) of the representation 251b of the first marker 300 included in the image captured by the other camera 201.

Next, the camera position-imaging direction calculator 232 refers to the IDs of the first markers 300a to 300e to read the arrangement positions of the first markers 300a to 300e stored in the storage 205, and uses such read arrangement positions to calculate the arrangement positions and the imaging directions in the space 500 of the two cameras 201 included in the camera pair. Then the matrix generator 234 determines a conversion matrix capable of conversion to the arrangement position (position information defined in three-dimensional space coordinates) of the first marker 300 in the space 500, from the combination of the position (two-dimensional coordinate information) of the representation of the first marker 300 included in the image captured by one of the cameras 201 and the position (two dimensional coordinate information) of the representation of the first marker 300 included in the image capture by the other of the cameras 201, based on the calculated arrangement positions and the imaging directions of the one camera 201 and the other camera 201. The conversion matrix is determined for each pair of cameras.

The second markers 102a, 102b, and 102c emit light that changes cyclically in a three-color pattern of red (R), green (G), and blue (B) modulated with the ID that enables unique identification of the marker.

After the determination of the conversion matrixes for each of the camera pairs, the light-emission position acquirer 236 detects light of the cyclical pattern of three colors included in the various images captured by the cameras 201a to 201d. Further, the light-emission position acquirer 236 attempts detection of the IDs, and demodulation to the IDs, corresponding to the patterns of such three-colored light-emission. In the case in which detecting the same ID from both of the images captured by the two cameras 201 included in the camera pair is possible, the light-emission position acquirer 236 regards the second marker 102 corresponding to such an ID to be detectable.

Thereafter, for each of the camera pairs, the light-emission position acquirer 236 acquires a position (Xga2, Yga2) of a representation of the second marker 102 in the imaging plane of one of the cameras 201 among the two cameras 201 included in the camera pair and a position (Xgb2, Ygb2) of a representation the second marker 102 in the imaging plane of the other cameras 201. Further, the light-emission position acquirer 236 acquires the combination of the positions (Xga2, Yga2) and (Xgb2, Ygb2) of both representations, and uses the conversion matrix to acquire the arrangement position (Xk2, Yk2, Zk2) of the second marker 102 in the space 500.

The aforementioned processing is a case in which arrangement positions corresponding to each of multiple camera pairs are acquired by use of a single second marker 102. In such a case, reliability degree information, that is, likelihood information, of the arrangement position within the space 500 is acquired for the second marker 102 for each of the camera pairs. The acquiring of the reliability degree information is described below.

For each camera pair, the imaging state acquirer 238 sets the reliability degree relating to the position of the representation of the second marker 102 in the acquired image from the imaging plane of one camera 201 among the two cameras 201 included in this camera pair such that the reliability degree is set higher as the position of the representation approaches the center of the image, and is set lower with increased distance of the position of the representation from the center. In the same manner, the imaging state acquirer 238 set the reliability degree relating to the position of the representation of the second marker 102 in the acquired image from the imaging plane of the other camera 201 such that the reliability degree is set higher as the position of the representation approaches the center of the image, and is set lower with increased distance of the position of the representation from the center. Such setting processing is related to distortion correction processing in the image processor 231; this distortion correction processing lessens correction intensity of distortion correction with increased closeness to the center in the imaging plane; and this distortion correction processing increases the correction intensity of distortion correction with increased closeness to the periphery. Therefore, as the position of the representation of the second marker 102 approaches the periphery, positional displacement due to distortion correction occurs that decreases the reliability degree.

Due to the aforementioned processing, reliability degree information (image position reliability degree information) B1 is acquired relating to the image position with respect to one second marker 102 under consideration for one of the cameras 201 among the two cameras 201 included in the camera pair, and reliability degree information (image position reliability degree information) B2 is acquired relating to the image position with respect the one second marker 102 under consideration for the other camera 102 among the two cameras 201 included in the camera pair.

Moreover, the imaging state acquirer 238 refers to multiple frames (images) acquired by consecutive capture by one of the cameras 201 among the two cameras 201 included in the camera pair, and calculates movement velocity of the second marker 102 on the basis of change of the position of the second marker 102.

Figure 5:
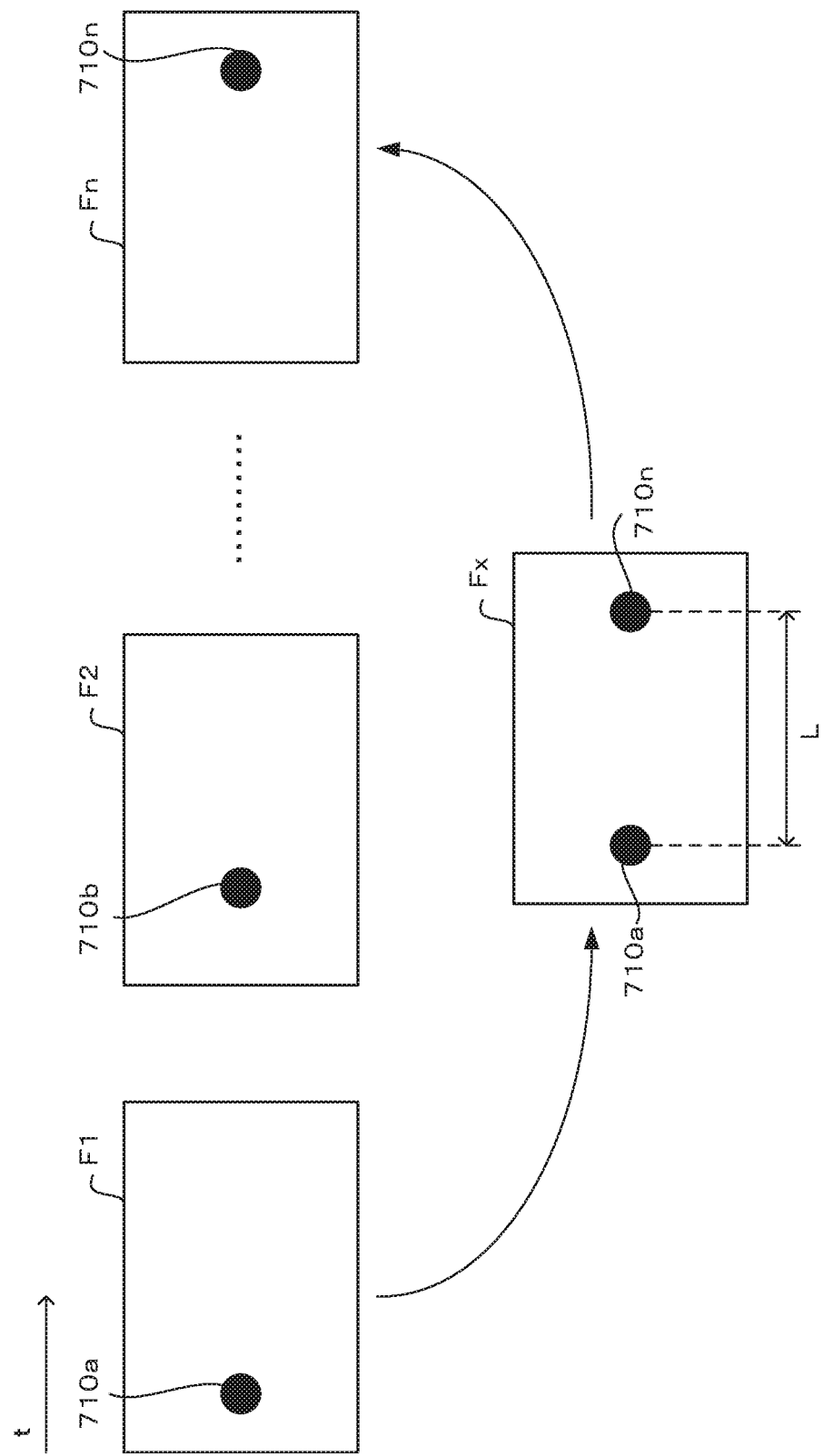
FIG. 5 illustrates an example of velocity calculation according to the same embodiment.

FIG. 5 illustrates an example of the velocity calculation. For example, the position of the representation of the second marker 102 in a frame F1 among multiple frames F1, F2, . . . Fn captured consecutively along a time direction t is "710a", and the position of the representation of the second marker 102 in the frame Fn is "710n". A case is considered below in which L is a distance between the positions 710a and 710n of the representation in a frame Fx that superimposes the frames F1 and Fn on each other. In such a case, as a result of a comparison between sizes of the representation of the second marker 102 in both frames versus a size of the second marker 102 that is previously known and stored beforehand in the storage 205, the imaging state acquirer 238 can calculate the movement velocity of the second marker 102 on the basis of the distance L and a frame rate. Further, the imaging state acquirer 238 sets the reliability degree of such movement velocity higher with increased slowness of the movement velocity, that is, with decreased distance L.

Similarly, the imaging state acquirer 238 calculates the movement velocity of this second marker 102 from the distance L between the positions of the representations of the second marker 102 in the images captured consecutively by the camera 201 that is the other camera 201 among the two cameras 201 included in the camera pair. Further, with respect to the reliability degree relating to such movement velocity, the imaging state acquirer 238 sets the velocity reliability degree higher with increased slowness of the movement velocity, that is, with decrease in the distance L.

The aforementioned processing is executed due to the possibility that the arrangement position changes, even when the second marker 102 is fixed at the same arrangement position for a long period, since the view angle of the camera 201 may change slightly and/or the second marker 102 may move slightly. Specifically, reliability degree information (velocity reliability degree information) C1 relating to the movement velocity with respect to the second marker 102 is acquired concerning one of the cameras 201 among the two cameras 201 included in the camera pair, and reliability degree information (velocity reliability degree information) C2 relating to the movement velocity with respect to the same second marker 102 is acquired concerning other camera 201.

Figure 6:
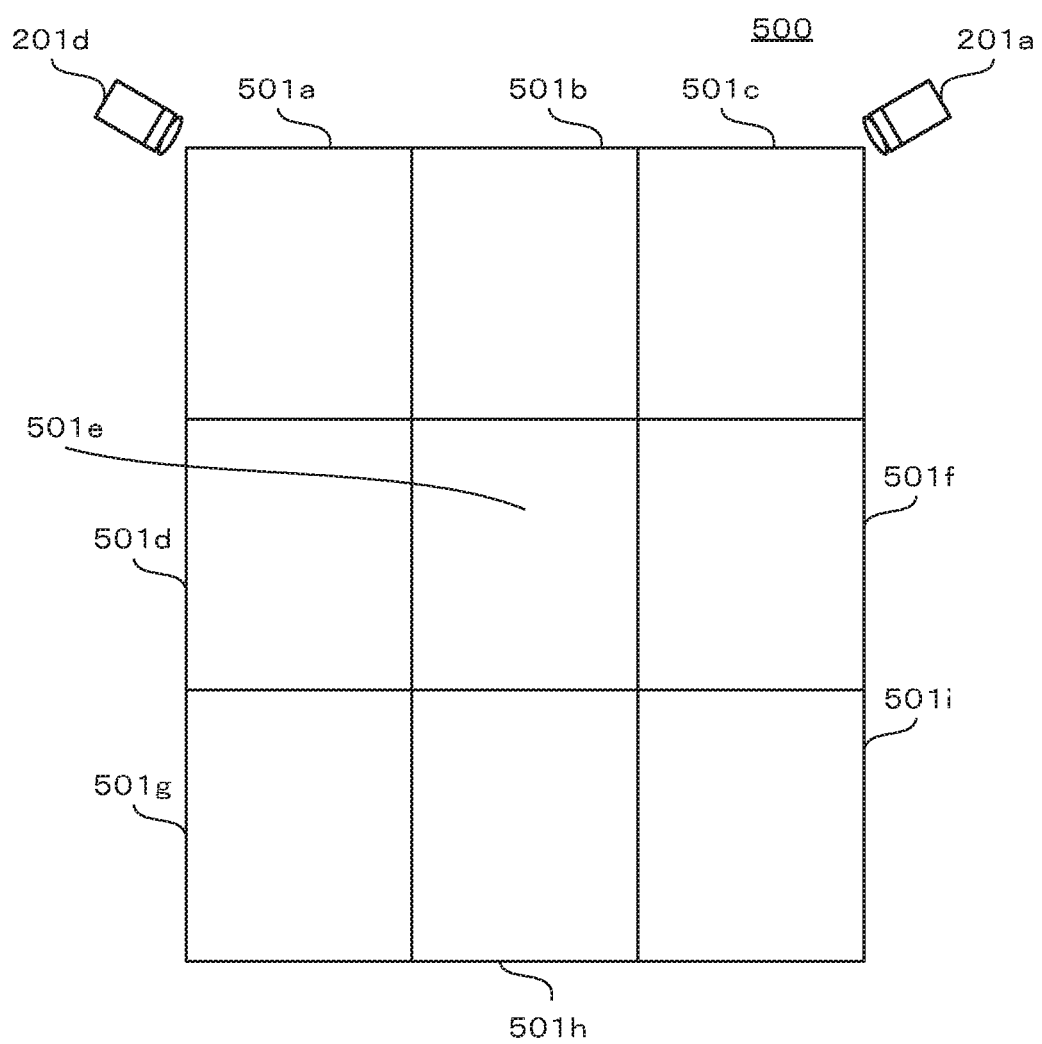
FIG. 6 illustrates an example of spatial partitioning according to the same embodiment.

Moreover, the imaging state acquirer 238 partitions the space 500 into multiple regions. FIG. 6 is an example of the spatial partitioning. In FIG. 6, 9 regions, that is, partitioning regions, 501a, 501b, 501c, 501d, 501e, 501f, 501g, 501h, and 501i (abbreviated below appropriately as the "partitioning region 501" when not limited to a given partitioning region 501a to 501i) are formed by dividing the image longitudinally into three equally dimensioned portions and dividing the image laterally into three equally dimensioned portions.

Further, on the basis of the relative positional relationship between the arrangement position of one of the second markers 102 under consideration and the arrangement positions of the two cameras 201 included in the camera pair, the imaging state acquirer 238 acquires reliability degree information D, that is, arrangement position reliability degree information, relating to the arrangement position of this second marker 102.

Specifically, due to the ability to capture a larger representation of the second marker 102, the imaging state acquirer 238 sets the arrangement position reliability degree higher with increased closeness to the arrangement position of the two cameras 201 included in the camera pair. For example, in the case in which the camera 201a and the camera 201d are arranged as illustrated in FIG. 6, the arrangement position degree is set a high value when the second marker 102 is present in the partitioning region 501a, 501b, or 501c; the arrangement position reliability degree is set to an intermediate value when the second marker 102 is present in the partitioning region 501d, 501e, or 501f; and the arrangement position reliability degree is set low when the second marker 102 is present in the partitioning region 501g, 501h, or 501i.

Moreover, for each pair of cameras, the reliability degree information acquirer 240 calculates an arrangement position, that is, position information defined by three-dimensional space coordinates, of the first marker 300 within the space 500, for the representations of the first marker 300 captured by both of the cameras 201 included the camera pair, by using the conversion matrix corresponding to the camera pair in combination with the position (two-dimensional coordinate information) captured by one of the cameras 201 and the position (two-dimensional coordinate information) captured by the other camera 201. Further, the reliability degree information acquirer 240 calculates an error between the calculated arrangement position of the first marker 300 within the space 500 and the arrangement position (previously known information) of the first marker 300 stored in the storage 205. Further, the reliability degree information acquirer 240 sets an error reliability degree information A so as to increase in reliability degree (error reliability degree) concerning the error with decrease in the error.

Thereafter, for each camera pair, the reliability degree information acquirer 240 calculates reliability degree information (reliability degree information of the second marker 102) N concerning the arrangement position calculation for one second marker 102 under consideration by use of the image position reliability degree information B1 and B2, the velocity reliability degree information C1 and C2, the arrangement position reliability degree information D, and the error reliability degree information A acquired in the aforementioned processing. For example, the calculation is by a formula $N=A\times(B1+B2+C1+C2+D)$.

Thereafter, the light-emission position acquirer 236 calculates the arrangement position of the second marker 102 within the space 500. During this calculation, sometimes the arrangement positions from multiple pairs of cameras are calculable for one second marker 102 under consideration. In such a case, for the one second marker 102 under consideration, the light-emission position acquirer 236 compares the reliability degree information N acquired for each camera pair. Then the light-emission position acquirer 236 selects the camera pair corresponding to the reliability degree information N that is highest.

Thereafter, the light-emission position acquirer 236 acquires the position (two-dimensional coordinate information) of the representation of the second marker 102 in the image captured by one camera 201 among the selected camera pair and the position (two-dimensional coordinate information) of the representation of the second marker 102 in the image captured by the other camera 201. Further, the light-emission position acquirer 236 uses the conversion matrix and the combination of the positions of these two representations to calculate the arrangement position (position information defined by three-dimensional space coordinates) of the second marker 102 within the space 500.

Figure 7:
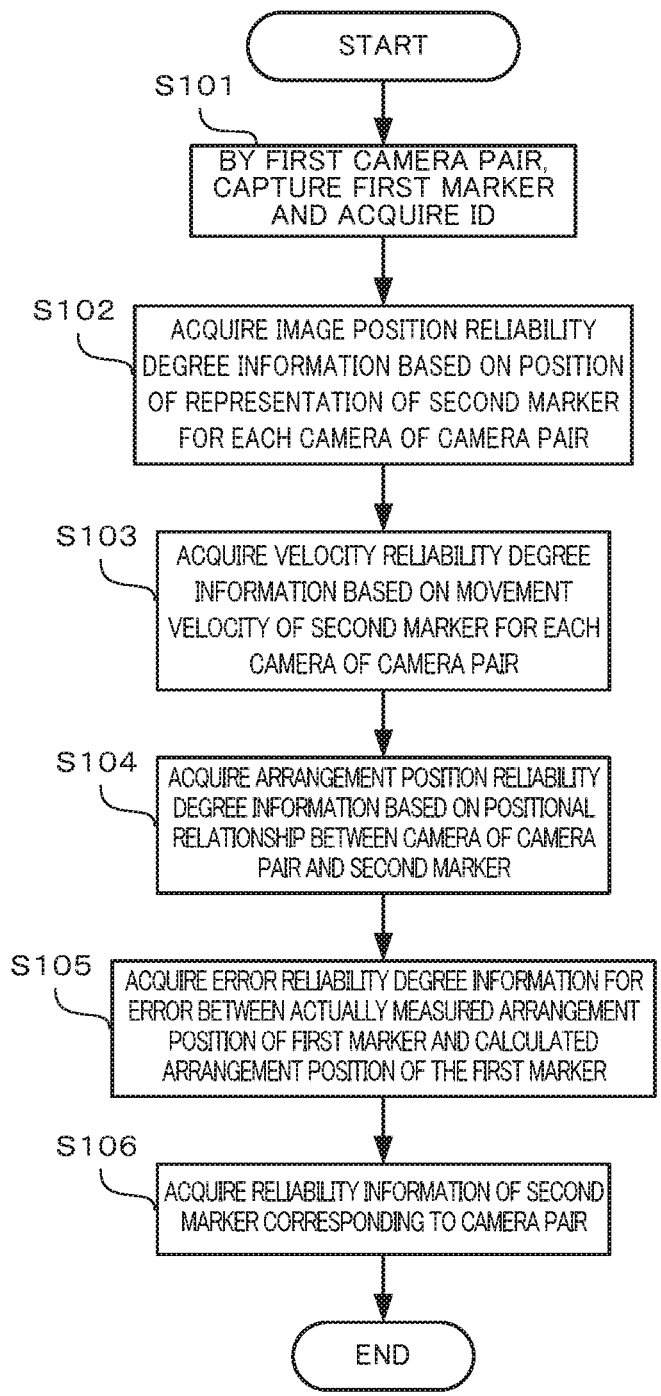
FIG. 7 is a flowchart illustrating an example of reliability degree information acquisition by the server according to the same embodiment.

Operation of the server 200 is described below with reference to flowcharts. FIG. 7 is a flowchart illustrating an example of reliability degree information acquisition by the server 200. The operation illustrated in FIG. 7 is performed for each camera pair, and for each first marker 300 captured by both of two cameras included in the camera pair.

The two cameras 201 included in the one camera pair capture the same first marker 300, and the first marker 300 is identified on the basis of the acquired ID (step S101).

Next, the imaging state acquirer 238 acquires the image position degree reliability information B1 such that the image position reliability degree increases, for the position of the representation of the second marker 102 in the image captured by one of the cameras 201 among the two cameras 201 included in the camera pair, with increased closeness to the center of the captured image, and acquires the image position degree reliability information B2 such that the image position reliability degree increases, for the position of the representation of the second marker 102 in the image captured by the other camera 201, with increased closeness to the center of the captured image (step S102).

Thereafter, on the basis of each of the images captured consecutively by one of the cameras 201 among the two cameras 201 included in the camera pair, the imaging state acquirer 238 calculates the movement velocity of the second marker 102, and acquires the velocity reliability degree information C1 such that the velocity reliability degree increases with increased slowness of the movement velocity. In a similar manner, on the basis of each of the images captured consecutively by the other camera 201, the imaging state acquirer 238 calculates the movement velocity of the second marker 102, and acquires the velocity reliability degree information C1 such that the velocity reliability degree increases with increased slowness of the movement velocity (step S103).

Thereafter, on the basis of the positional relationship between the arrangement position of the two cameras 201 included in the camera pair and the arrangement position of the second marker 102, the imaging state acquirer 238 acquires the arrangement position reliability degree information D such that the arrangement position reliability degree increases with increased closeness of the arrangement position of the second marker 102 to the arrangement position of the two cameras 201 included in the camera pair (step S104).

Thereafter, concerning the representation of the first marker 300 captured by both of the two cameras 201 included in the camera pair, the reliability degree information acquirer 240 uses the conversion matrix corresponding to the camera pair and the combination of the position obtained by capture by one of the cameras 201 and the position obtained by capture by the other camera 201 to calculate the arrangement position of the first marker 300 within the space 500. The reliability degree information acquirer 240 calculates the error between the calculated arrangement position of the first marker 300 within the space 500 and the arrangement position (previously known information) of the first marker 300 stored in the storage 205, and acquires the error reliability degree information A such that the error reliability degree increases with increased smallness of the error (step S105).

Further, the reliability degree information acquirer 240 acquires the reliability degree information N of the second marker 102 by using the acquired image position reliability degree information B1 and B2, the velocity reliability degree information C1 and C2, the arrangement position reliability degree information D, and the error reliability degree information A (step S106).

Figure 8:
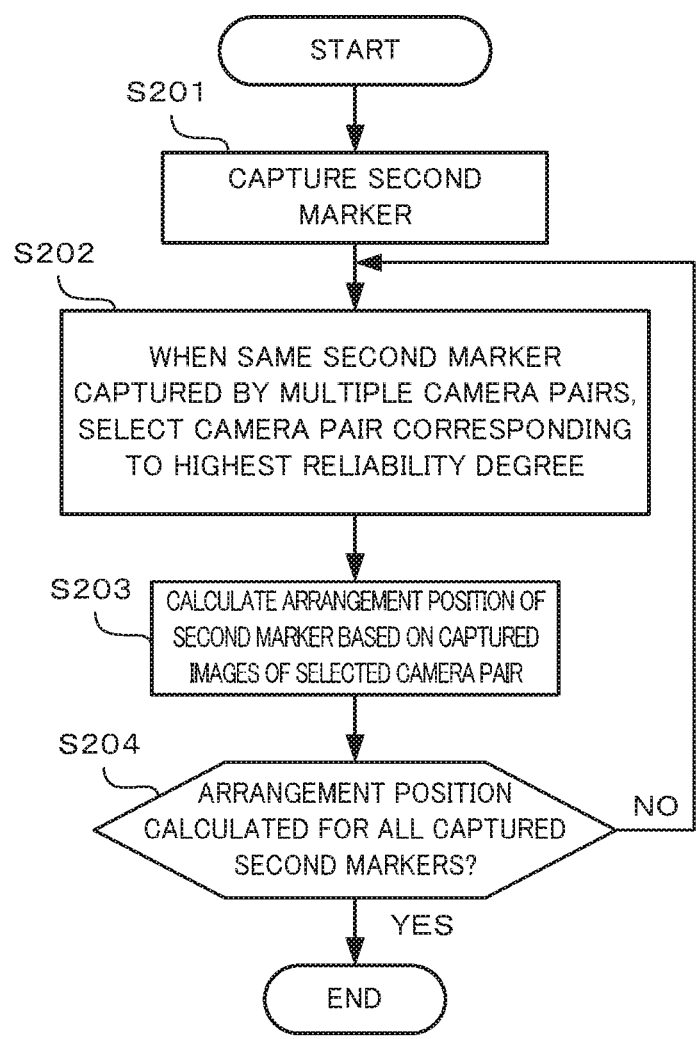
FIG. 8 is a flowchart illustrating an example of acquisition processing of an arrangement position of a second marker by the server according to the same embodiment.

FIG. 8 is a flowchart illustrating an example of acquisition processing of the arrangement position of the second marker 102 by the server 200. Multiple cameras 201 capture the second marker 102 within the space 500 (step S201).

Thereafter, for a single second marker 102, in the case in which multiple camera pairs exist in which both of the two cameras 201 capture the second marker 102, the light-emission position acquirer 236 selects the reliability degree information that is highest among the reliability degree information of the second marker 102 acquired by each of these multiple camera pairs. Further, the light-emission position acquirer 236 selects the camera pair that corresponds to such selected reliability degree information (step S202).

Thereafter, the light-emission position acquirer 236 acquires the position of the representation of the second marker 102 in the image captured by one camera 201 among the selected camera pair and the position of the representation of the second marker 102 in the image acquired captured by the other camera 201. Further, the light-emission position acquirer 236 uses the conversion matrix and the combination of the two acquired positions to calculate the arrangement position of the second marker 102 (step S203).

Thereafter, the light-emission position acquirer 236 determines whether the arrangement position is calculated for all the second markers 102 captured in step S201 (step S204). If the arrangement positions are calculated for all of the second markers 102 (YES in step S204), the sequence of processing ends. Moreover, if a second marker 102 exists for which the arrangement position is not calculated (NO in step S204), the operations of step S202 and beyond are repeated.

In the present embodiment in this manner, for each of the camera pairs, the server 200 acquires the reliability degree information concerning the calculation of the arrangement position the second marker from the positions of the second marker 102 in the images captured by both of the two cameras 201 included in the camera pair. Further, the server 200 calculates the arrangement position of the second marker 102 on the basis of the images captured by the camera pair. At this time, in the case in which the arrangement position of the second marker 102 is calculable for each of the camera pairs by capturing the second marker 102 by multiple camera pairs, the server 200 selects the camera pair having the highest reliability degree of the second marker 102, and calculates the arrangement position of the second marker 102 on the basis of the images captured by such a pair of cameras. Due to such operation, the arrangement position of the second marker 102 is calculable on the basis of the camera pair having a high reliability degree of the second marker 102, and accuracy of the calculation can be improved.

Specifically, the server 200 acquires the image position reliability degree information such that the image position reliability degree of the image position of the second marker 102 in the captured image increases as the image position of the second marker 102 approaches the center of the image. Due to such operation, the reliability degree of the second marker 102 can decrease with increased distance of the image position of the second marker 102 from the center of the image, and reliability degree information can be acquired that is suitable in accordance with the characteristic of the image that is increased distortion with increased separation from the center.

Moreover, the server 200 calculates the velocity of the second marker 102 on the basis of the captured images, and acquires the velocity reliability degree information such that the velocity reliability degree increases with increased slowness of the velocity. Due to such operation, reliability degree information can be acquired that is suitable in accordance with the lowering of calculation accuracy of the arrangement position of the second marker 102 with increase in the movement velocity.

Moreover, the server 200 acquires the arrangement position reliability degree information such that the arrangement position reliability degree is higher with increased closeness of the arrangement position of the second marker 102 to the arrangement positions of the two cameras 201 included in the camera pair. Due to such operation, reliability degree information can be acquired that is suitable in accordance with the decrease in calculation accuracy of the arrangement position with increased distance of separation from the cameras 201 in general triangulation.

Moreover, the server 200 calculates the error between the calculated arrangement position of the first marker 300 within the space 500 and the previously known information of the arrangement position of the first marker 300, and acquires the error reliability degree information such that the error reliability degree increases with increased smallness of this error. Due to such operation, the camera pair having a small error, that is, having high calculation accuracy, can be prioritized for use in the calculation of the arrangement position of the second marker 102.

Another embodiment is explained below. In the present embodiment, the visible light communication system 1 is similar to that of FIG. 1, and the server 200 is similar to that FIG. 2. In the present embodiment, arrangement positions of the first marker 300 and the second marker 102 are multiply calculated with respect to one marker, and reliability degree information is set with respect the respective arrangement positions.

Figure 9:
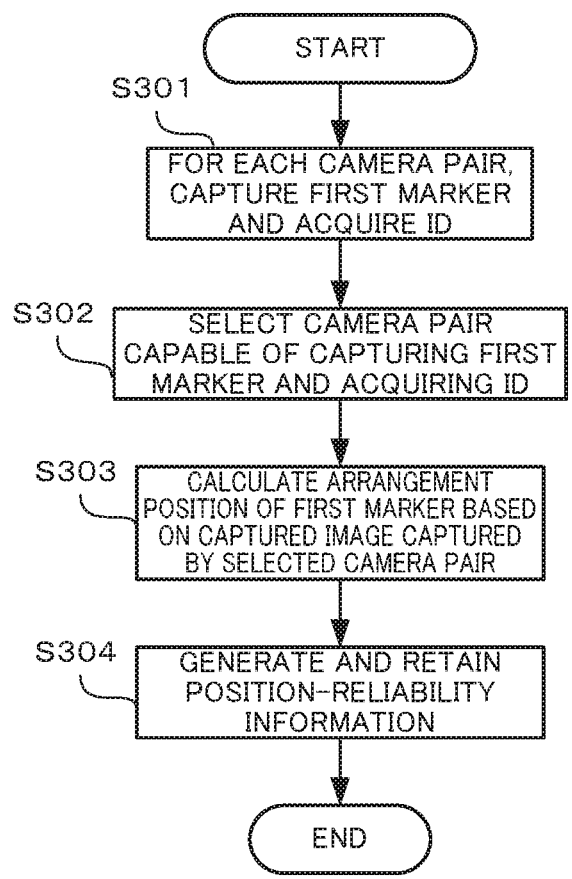
FIG. 9 is a flowchart illustrating an example of generating and retaining a position-reliability degree information table by a server according to another embodiment.

FIG. 9 is a flowchart illustrating an example of generating and retaining the position-reliability degree information table by the server 200 according to the other embodiment. The operations illustrated in FIG. 9 are performed for each of the first markers 300.

For each of the camera pairs, upon capture of the same first marker 300 by the two cameras 201 included in the camera pair, this captured image is acquired via the image input unit 204, and the controller 202 attempts to identify the first marker 300 by controller ID acquisition (step S301).

Thereafter, the camera position-imaging direction calculator 232 in step S301 captures the first marker, and selects a camera pair capable of acquiring the ID (step S302).

Thereafter, for each camera pair selected in step S302, the light-emission position acquirer 236 calculates the arrangement position of the first marker 300 on the basis of the captured image captured by the two cameras 201 included in the camera pair (step S303). Specifically, similarly to step S203 in FIG. 8, the light-emission position acquirer 236 acquires the position of the representation of the first marker 300 in the image captured by one of the cameras 201 among the camera pair and the position of representation of the first marker 300 in the image captured by the other camera 201. Further, the light-emission position acquirer 236 calculates the arrangement position of the first marker 300 by using the conversion matrix corresponding to the camera pair and the combination of such two acquired positions.

Next, the reliability degree information acquirer 240 generates, and retains in the storage 205, a position-reliability degree information table 2051 concerning the first marker 300 for which the arrangement position is calculated in step S303 (step S304).

FIG. 10 illustrates an example of the generated position-reliability degree information table 2051 retained in a certain storage region of the storage 205 in step S304. The position-reliability degree information table 2051 illustrated in FIG. 10 includes, for each first marker 300 that is a marker: the ID of the first marker 300, the arrangement positions captured by the camera pairs capturing the first marker 300, the information of the camera pair capturing the image used in the calculation of the arrangement position, the reliability degree information of the arrangement position, the update time and date indicating the time and date of calculation of the arrangement position, and the error.

The reliability degree information is set in three stages as A, B, and C in order of decreasing reliability degree. For the first marker 300, the reliability degree information acquirer 240 sets the reliability degree information by suitably selecting the image position reliability degree information acquired in a manner similar to that of step S102 in FIG. 7, the velocity reliability degree information acquired in a manner similar to that of step S103 in the same drawing, the arrangement position reliability degree information acquired in a manner similar to that of step S104 in the same drawing, and the error reliability degree information acquired in a manner similar to that of step S105 in the same drawing, or the like.

The error is set in three stages as R1, R2, and R3 in order of increasing size of the error. The reliability degree information acquirer 240, for example, sets the error so as to be smaller with increased approach of the update time and date to the present time and date.

Figure 11:
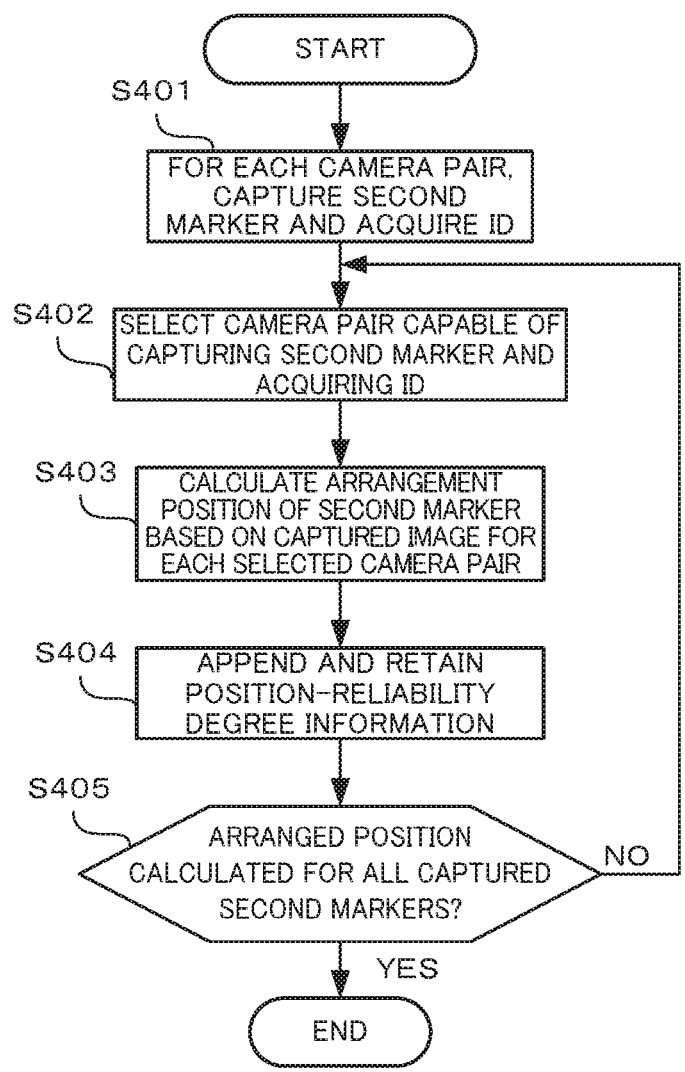
FIG. 11 is a flowchart illustrating an example of generating and retaining a position-reliability degree information table by the server according to the other embodiment.

FIG. 11 is a flowchart illustrating another example of generating and retaining the position-reliability degree information table by the server 200 according to another embodiment. The operation illustrated in FIG. 11 is performed for each second marker 102.

For each camera pair, the two cameras 201 included in the camera pair capture the same second marker 102, and by acquiring the ID, attempt to identify the second marker 102 by ID acquisition (step S401).

The camera position-imaging direction calculator 232 selects the camera pairs capable of capturing the second marker 102 and acquiring the ID in step S401 (step S402).

Next, for each of the camera pairs selected in step S402, the light-emission position acquirer 236 calculates the arrangement position of the second marker 102 on the basis of the captured image captured by the pair of cameras 201 included in the camera pairs (step S403). Specifically, in a manner similar to that of step S203 in FIG. 8, the light-emission position acquirer 236 acquires the representation of the second marker 102 in the image captured by one of the cameras 201 among the camera pair, and acquires the position of the representation of the second marker 102 in the image captured by the other camera 201. Further, the light-emission position acquirer 236 calculates the arrangement position of the second marker 102 by using the conversion matrix corresponding to the camera pair and the combination of these two image positions.

Thereafter, the reliability degree information acquirer 240 generates position-reliability degree information concerning the second marker 102 for which the arrangement position is calculated in step 403, and appends and retains such position-reliability degree information in the position-reliability degree information table 2051 (step S404).

FIG. 12 illustrates an example of a position-reliability degree information table 2052 in step S404. FIG. 12 illustrates the position-reliability degree information table 2052 obtained by appending the position-reliability degree information generated for each of the second markers 102 in step S404 to the position-reliability degree information table 2051 generated for each of the first markers 300 as illustrated in FIG. 10.

The position-reliability degree information table 2052 generated for each of the second markers 102, in a manner similar to that of the position-reliability degree information table 2051 generated for each of the first markers 300, includes the ID of the second marker 102, the arrangement position obtained by capture by the camera pair capturing this second marker 102, the information of the camera pair capturing the image used in the calculation of the arrangement position, the reliability degree information of the arrangement position, the update time and date indicating the time and date at which the arrangement position is calculated, and the error.

The reliability degree information is set in three stages, that is, A, B, and C in order of decreasing reliability degree. The reliability degree information acquirer 240, for the second marker 102, selects and sets reliability degree information such as the image position reliability degree information acquired similarly to step S102 of FIG. 7, the velocity reliability degree information acquired similarly to step S103 of the same drawing, the arrangement position reliability degree information acquired similarly to step S104 of the same drawing, the error reliability degree information acquired similarly to step S105 of the same drawing, or the like.

Further, for the second marker 102, the reliability degree information acquirer 240 may be configured to acquire the arrangement position, the reliability degree information, and the error of the second marker 102 by acquiring the arrangement position of the first marker 300.

The error is set in three stages as R1, R2, and R3 in order of increasing size of the error. The reliability degree information acquirer 240, for example, sets the error smaller with increasing nearness of the update time and date to the present time and date.

Next, the light-emission position acquirer 236 determines whether the arrangement position is calculated for all of the second markers 102 captured in step S401 (step S405). If the arrangement position is calculated for all of the second markers 102 (YES in step S405), the series of operations ends. If a second marker 102 exists for which the arrangement position is not calculated (NO in step S405), the operations of step S402 and beyond are repeated.

By generating and retaining the position-reliability degree information table concerning the first marker 300 and the second marker 102 in this manner, the reliability degree information is acquired for the calculated arrangement positions of the first marker 300 and the second marker 102. Therefore, the arrangement position of highest reliability degree can be calculated for the first marker 300 and the second marker 102, and the most appropriate arrangement position can be selected in consideration of both the reliability degree information and the error.

Further, the identification of arrangement positions can be performed appropriately in cases such as when identification of the arrangement position is not possible for the first marker 300 and the second marker 102 for which only the arrangement position of low reliability degree is calculated, for the first marker 300 and the second marker 102 for which the suitable arrangement position is not calculated in consideration of both the reliability degree information and the error, or the like.

Figure 13:
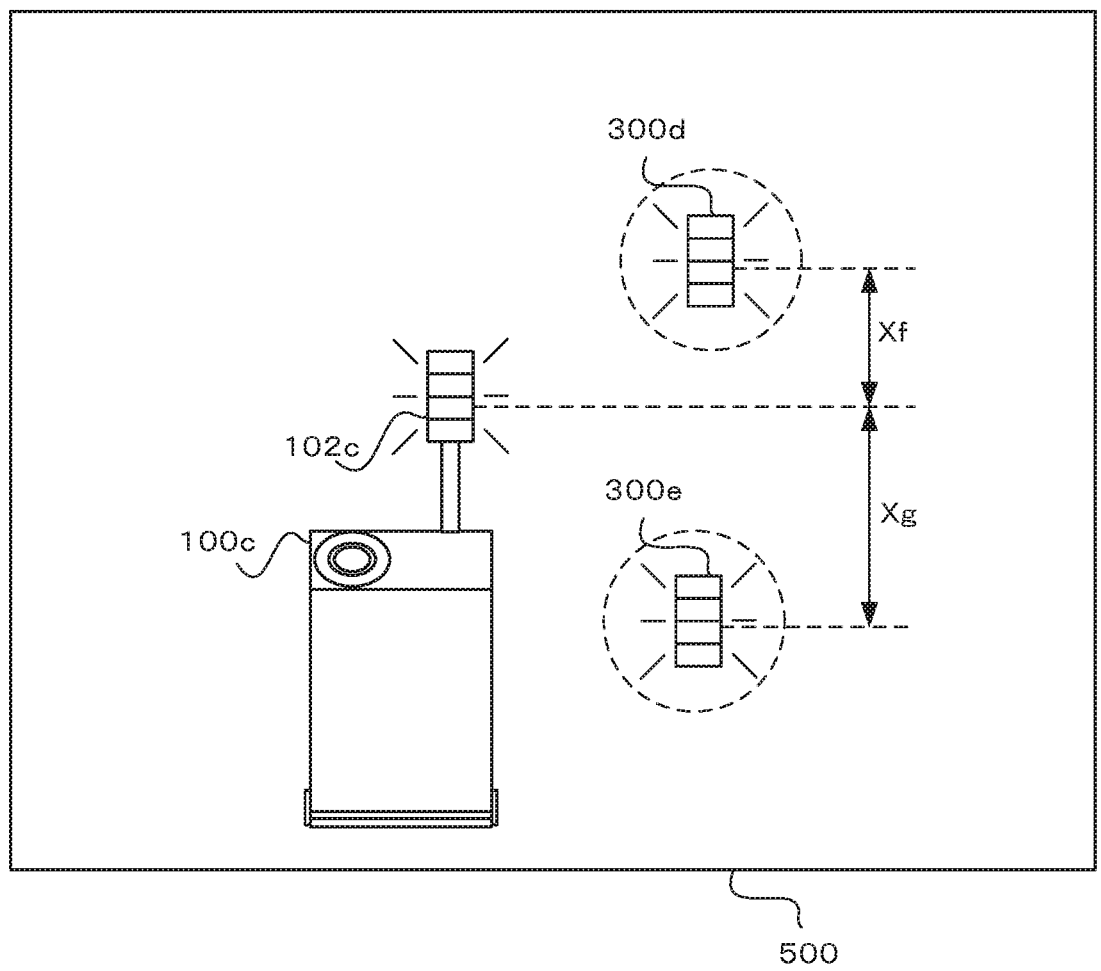
FIG. 13 illustrates an example of positional error calculation according to the other embodiment.

Moreover, in the case in which only the position-reliability degree information table 2051 is generated, the arrangement position, the reliability degree information, and the error of the second marker 102 can be determined thereafter. That is to say, a case is described below in which, after generation of only the position-reliability degree information table 2051, and then after removal of the first marker 300 from the space 500, the interior of the same space 500 is captured by the cameras 201a to 201d. As illustrated in FIG. 13, after generation and retention of the position-reliability degree information table 2051 for the space 500, the first marker 300 is removed, and the second marker 102c is taken to be newly arranged (normal operation state). Then upon capturing images of the space 500 in this state by the cameras 201a to 201d and then inputting of the captured images to the image input unit 204, the image processor 231 detects the second marker 102c from these images. Further, the arrangement position of the second marker 102c is calculated from the matrix and the representations of the second marker 102c in these captured images. Then the position-reliability degree information table 2051 is referred to, and information is read for the first marker (first markers 300d and 300e in FIG. 13) 300 captured by the camera pair having a high degree of reliability and positioned close to the calculated arrangement position of the second marker 102c. The error E of the second marker 102c is determined by the below-described method. The error E of the position of the second marker 102c is determined by substitution into the formula $E=(Ef \times Xg+Eg \times Xf)/(Xf+Xg)$, in which, as illustrated in FIG. 13, an X direction distance between the first marker 300d and the second marker 102c in the space is represented by Xf, an X direction distance between the first marker 300e and the second marker 102c is represented by Xg, an error between the calculated position and the position based on previously known information for the first marker 300d is represented by Ef, and error between the calculated position and the position based on previously known information for the first marker 300e is represented by Eg.

Further, the present invention is not limited to the description and drawings of the aforementioned embodiments, and suitable modifications of the aforementioned embodiments and drawings are possible.

For example, in the aforementioned embodiments, the reliability degree information acquirer 240 calculates the reliability degree information N concerning a single second marker 102 under consideration based on the formula $N=A\times(B1+B2+C3+C2+D)$, using for each camera pair, the image position reliability degree information B1 and B2, the velocity reliability degree information C1 and C2, the arrangement position reliability degree information D, and the error reliability degree information A that are acquired from the aforementioned processing.

However, the calculation formula is not limited to the above formula, and for example, the image position reliability degree information B1 and B2, the velocity reliability degree information C1 and C2, the arrangement position reliability degree information D, and the error reliability degree information A may be all multiplied together. Alternatively, the reliability degree information acquirer 240 may calculate the reliability degree information N for the second marker 102 by appropriate selection of the image position reliability degree information B1 and B2, the velocity reliability degree information C1 and C2, the arrangement position reliability degree information D, and the error reliability degree information A. For example, a configuration may be used that does not multiply by the error reliability degree information A when the highest reliability degree information of the second marker 102 is less than a threshold. Further, for example, the arrangement position reliability degree information D may be calculated for each of the two cameras 201 included in the camera pair. Further, a configuration may be adopted that reads and uses the information of the camera pair having the most recent update time and date.

Moreover, in the aforementioned embodiment, the server 200 selects the camera pair having the highest reliability degree for the second marker 102, and calculates the arrangement position of the second marker 102 on the basis of the images captured by such a camera pair. However, the calculation procedure for the arrangement position is not limited to this configuration.

For example, the server 200 may calculate the arrangement position of the second marker 102 on the basis of captured images captured by camera pairs that are all the camera pairs capturing images of the second marker 102 using both of the two cameras 201, and may, with increasing reliability degree of the second marker 102 for the camera pair, increase a weighting of the arrangement position of the second marker 102 calculated on the basis of capture by these camera pairs. Moreover, the server 200 may be configured to calculate an average value of the arrangement position of the second marker 102 calculated on the basis of the images of camera pairs that are highly ranked in reliability degree for the second marker 102.

Moreover, in the aforementioned embodiments as illustrated in FIG. 6, although the space 500 is partitioned into 9 partitioning regions 501a to 501i, the arrangement position reliability degree information is taken to be high if the second marker 102 is present in the partitioning regions

501*a*, 501*b*, or 501*c*, the arrangement position reliability degree information is taken to be intermediate if present in the partitioning regions 501*d*, 501*e*, or 501*f*, and the arrangement position reliability degree information is taken to be low if present in the partitioning regions 501*g*, 501*h*, or 501*i*, the setting of the partitioning regions 501 and/or the arrangement reliability degree information corresponding to each of the partitioning regions is not limited to this configuration. The arrangement reliability degree information may differ between each of the partitioning regions 501.

Moreover, although the first marker 300 is stored in association with the IDs in the storage 205 and in association with the arrangement position within the space 500, by visible light communication, light may be emitted that is modulated in accordance with the arrangement position within the space 500.

Moreover, in the aforementioned embodiments, although the reliability degree information within the position-reliability degree information table is set in three stages as A, B, and C in order of decreasing reliability degree, this configuration is not limiting, and the reliability degree information may be set to a greater number of stages, or may be set to a numerical value. Moreover, although the reliability degree information is set by appropriate selection of the image position reliability degree information, the velocity reliability degree information, the arrangement position reliability degree information, the error reliability degree information, or the like, this configuration is not limiting.

Further, although the error within the position-reliability degree information table is set in three stages as R1, R2, and R3 in order of increasing size of the error, this configuration is not limiting, and the error may be set using a greater number of stages, or may be set to a numerical value. Moreover, although the error is set so as to decrease with increased closeness of the update time and date to the present time and date, this configuration is not limiting.

For example, the first marker 300 and the second marker 102 are not limited to LEDs. For example, the marker may include part of an LCD, PDP, EL display, or the like included in a display.

Moreover, the server 200 may be any device to which the cameras are attachable.

Further, a program for execution of the aforementioned embodiments may be stored and distributed on a flexible disc, compact disc read-only memory (CD-ROM), digital versatile disc (DVD), magneto-optical (MO) disc, or the like computer-readable recording medium, and by installation of the program, a system may be configured that executes the aforementioned processing.

Further, the program may be stored on a disc device or the like of a certain server on a communication network such as the Internet and, for example, may be superimposed on carrier waves and downloaded, or the like.

Moreover, in the case of realization of the aforementioned functions by execution allocated to an operating system (OS) or by execution in cooperation between the OS and an application, performance of the containing and distributing of the aforementioned recording medium, or downloading or the like, for the non-OS portion alone is permissible.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A position information acquisition device for acquiring three dimensional position information of a position information acquisition target arranged in a space, the position information acquisition device comprising:
    a processor configured to
        detect light that is based on identification information included in-common in captured images that are acquired by capturing images of the space using a pair of image capturing devices from a plurality of shooting directions that are different from each other, the pair of image capturing devices being arranged at different positions,
        acquire two-dimensional position information and an imaging direction of each of the pair of image capturing devices, based on detection positions of the detected light in the captured images and two-dimensional position information of the light stored in a storage,
        acquire three-dimensional position information, in the space, of the position information acquisition target identified by the identification information, from the captured images acquired by the capturing by the pair of image capturing devices, based on the acquired two-dimensional position information and the acquired imaging directions of the pair of image capturing devices,
        acquire reliability degree information of the acquired three-dimensional position information of the position information acquisition target, based on information relating to an optical characteristic as information relating to an imaging state of each of the pair of image capturing devices during the capturing of the captured images, and
        store the acquired the reliability degree information in the storage.

2. The position information acquisition device according to claim 1, wherein the information relating to the imaging state is information based on the detection positions of the detected light in the captured image.

3. The position information acquisition device according to claim 1, wherein the information relating to the imaging state is information based on a timing of capturing the images.

4. The position information acquisition device according to claim 1, wherein the information relating to the imaging state is information relating to movement of the position information acquisition target in the space.

5. The position information acquisition device according to claim 4, wherein the processor further acquires the information relating to the movement of the position information acquisition target by comparison of a plurality of the images captured successively by the image capturing devices.

6. A position information acquisition method for acquiring three-dimensional position information of a position information acquisition target arranged in a space, the position information acquisition method comprising:
    detecting light that is based on identification information included in-common in captured images that are acquired by capturing images of the space using a pair of image capturing devices from a plurality of shooting directions that are different from each other, the pair of image capturing devices being arranged at different positions;

acquiring two-dimensional position information and an imaging direction of each of the pair of image capturing devices, based on detection positions of the detected light in the captured images and two-dimensional position information of the light stored in a storage, acquiring three-dimensional position information, in the space, of the position information acquisition target identified by the identification information, from the captured images acquired by the capturing by the pair of image capturing devices, based on the acquired two-dimensional position information and the acquired imaging directions of the pair of image capturing devices;

acquiring reliability degree information of the acquired three-dimensional position information of the position information acquisition target, based on information relating to an optical characteristic as information relating to an imaging state of each of the pair of the image capturing devices during the capturing of the captured images; and storing the acquired the reliability degree information in the storage.

7. A non-transitory computer-readable recording medium recording a program for causing a computer included in a position information acquisition device for acquiring three-dimensional position information of a position information acquisition target arranged in a space to function as:

detecting light that is based on identification information included in-common in captured images that are acquired by capturing images of the space using a pair of image capturing devices from a plurality of shooting directions that are different from each other, the pair of image capturing devices being arranged at different positions;

acquiring two-dimensional position information and an imaging direction of each of the pair of image capturing devices, based on detection positions of the detected light in the captured images and two-dimensional position information of the light stored in a storage;

acquiring three-dimensional position information, in the space, of the position information acquisition target identified by the identification information, from the captured images acquired by the capturing by the pair of image capturing devices, based on the acquired two-dimensional position information and the acquired imaging directions of the pair of image capturing devices, acquiring reliability degree information of the acquired three-dimensional position information of the position information acquisition target, based on information relating to an optical characteristic as information relating to an imaging state of each of the pair of the image capturing devices during the capturing of the captured images, and storing the acquired the reliability degree information in the storage.

* * * * *